(12) United States Patent
Day

(10) Patent No.: US 11,729,308 B2
(45) Date of Patent: Aug. 15, 2023

(54) COMMUNICATION SYSTEM WITH STEALTH MODE FOR MOBILE DEVICE

(71) Applicant: GM GLOBAL TECHNOLOGY OPERATIONS LLC, Detroit, MI (US)

(72) Inventor: Brian A Day, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 16 days.

(21) Appl. No.: 17/531,996

(22) Filed: Nov. 22, 2021

(65) Prior Publication Data

US 2023/0164261 A1 May 25, 2023

(51) Int. Cl.
| | |
|---|---|
| *H04M 1/72463* | (2021.01) |
| *H04L 51/02* | (2022.01) |
| *H04M 1/72418* | (2021.01) |
| *H04M 1/7243* | (2021.01) |
| *H04W 4/90* | (2018.01) |
| *H04W 4/02* | (2018.01) |

(52) U.S. Cl.
CPC ........ *H04M 1/72463* (2021.01); *H04L 51/02* (2013.01); *H04M 1/7243* (2021.01); *H04M 1/72418* (2021.01); *H04W 4/025* (2013.01); *H04W 4/90* (2018.02)

(58) Field of Classification Search
CPC ......... H04M 1/72463; H04M 1/72418; H04M 1/7243; H04L 51/02; H04W 4/025; H04W 4/90
See application file for complete search history.

(56) References Cited

U.S. PATENT DOCUMENTS

| | | | | |
|---|---|---|---|---|
| 2012/0034897 | A1* | 2/2012 | Kreitzer | H04M 3/42382 455/457 |
| 2014/0329491 | A1* | 11/2014 | Scott | H04M 11/045 455/404.1 |
| 2017/0153694 | A1* | 6/2017 | Baldwin | G06F 1/3212 |
| 2019/0149490 | A1* | 5/2019 | Tokuchi | H04L 51/224 709/206 |

\* cited by examiner

*Primary Examiner* — Farid Seyedvosoghi
(74) *Attorney, Agent, or Firm* — Quinn IP Law

(57) ABSTRACT

A communication system is presented for a mobile device having a mobile application stored on the mobile device. The mobile application has a graphical user interface and a touchscreen. A controller is configured to interface with the mobile application. The controller includes a processor and tangible, non-transitory memory on which instructions are recorded. The controller is adapted to selectively execute a stealth mode for message transmissions between a user of the mobile device and a remote assistance unit. The stealth mode is activated based in part on a signal from the mobile application and includes muting each audio stream in the mobile device and disabling vibrate notifications. A first phase of inquiries is submitted to the user, via the graphical user interface, along with one or more pre-populated replies. The stealth mode includes alerting an advisor in the remote assistance unit.

17 Claims, 3 Drawing Sheets

COMMUNICATION SYSTEM WITH STEALTH MODE FOR MOBILE DEVICE

INTRODUCTION

The present disclosure relates generally to a communication system for a mobile device. More specifically, the disclosure relates to a communication system having a stealth mode for message transmissions between a user of the mobile device and a remote assistance unit. Persons who need to covertly request help on a phone have limited options. One option may be to telephone emergency services and stay on the line without speaking. This approach has several drawbacks. For example, the voice of the advisor may be emitted from the earpiece of the mobile device, and with no words being spoken, little to no information about the situation is given to the emergency advisor. Additionally, if the call is ended, the advisor is likely to call back, sounding the phone's ringer. Another option is to use a texting service for emergencies (e.g., E911), but this service is not available in many areas and relies on the user's texting application, where typing can be slow and error prone. Furthermore, if the user is in plain sight of a captor, texting is less than ideal because it requires an amount of physical activity and visual attention that could betray the secrecy of the communication.

SUMMARY

Disclosed herein is a communication system for a mobile device. The mobile device has a mobile application stored on it, with a graphical user interface and a touch screen. A controller is configured to interface with the mobile application. The controller includes a processor and tangible, non-transitory memory on which instructions are recorded. The controller is adapted to selectively execute a stealth mode for message transmissions between a user of the mobile device and a remote assistance unit. The stealth mode is activated based in part on a signal from the mobile application and includes muting each audio stream in the mobile device and disabling vibrate notifications A first phase of inquiries is submitted to the user, via the graphical user interface, along with one or more pre-populated replies. The stealth mode includes alerting an advisor in the remote assistance unit.

Operating the stealth mode may include executing a second phase after the first phase, via the mobile application. The second phase is dynamically assembled based on respective responses from the user to the first phase. Operating the stealth mode may include monitoring a power level of the mobile device in real time. Operating the stealth mode may include enabling a non-disturbance mode to limit visual interruption.

Operating the stealth mode may include monitoring at least one sensor in the mobile device for a predefined event and transmitting a background message to the remote assistance unit to signal detection of the predefined event. The predefined event includes the user changing a geographical location. Operating the stealth mode may include remotely manipulating at least one of multiple hardware settings in the mobile device, based in part on the predefined event and/or a power level of the mobile device. The multiple hardware settings include at least one of volume control, battery power management and display brightness.

The mobile application may be adapted to maintain respective messages from the remote assistance unit in a local queue, such that the respective messages are presented successively without dead air therebetween. The message transmissions may incorporate a text messaging protocol, including transmitting delimited text strings having respective messages and respective metadata.

The message transmissions may include respective dual streams presenting a dialog box in a foreground and a chat transcript box in a background of the mobile device. The message transmissions to the user may include silent interrogatories driven by the controller and/or the advisor. The message transmissions to the user may include directives driven by the controller and/or the advisor. The message transmissions to the user may include open-ended questions driven by the controller and/or the advisor.

Operating the stealth mode may include transmitting background messages to the remote assistance unit, the background transmissions being triggered by a timer. Here, the background messages are not shown in the chat transcript box. The first phase may include inquiries regarding a nature of an emergency and a location of the emergency. In some embodiments, a cloud unit is configured to interface with and provide a user profile data to the mobile application and the controller. The user profile data includes respective location coordinates of the mobile device.

Disclosed herein is a method of operating a communication system for a mobile device. The method includes storing a mobile application stored on the mobile device, the mobile application having a graphical user interface and a touchscreen. The mobile application interfaces with a controller having a processor and tangible, non-transitory memory on which instructions are recorded. The method includes selectively executing a stealth mode for message transmissions between a user of the mobile device and a remote assistance unit, via the controller. This includes activating the stealth mode based in part in a signal from the mobile application, disabling vibrate notifications and muting each audio stream in the mobile device. A first phase of inquiries is submitted to the user, via the graphical user interface, along with one or more pre-populated replies. The method includes alerting an advisor in the remote assistance unit.

The above features and advantages and other features and advantages of the present disclosure are readily apparent from the following detailed description of the best modes for carrying out the disclosure when taken in connection with the accompanying drawings.

Figure 1:
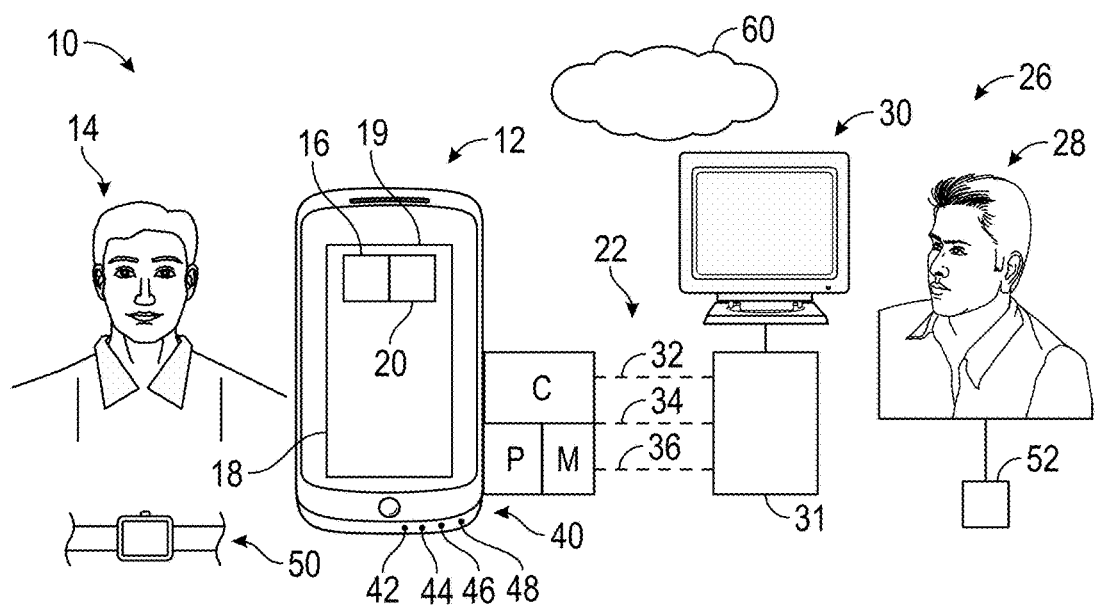
FIG. 1 is a schematic fragmentary diagram of a communication system having a stealth mode for message transmissions between a mobile device and a remote assistance unit.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Figure 2:
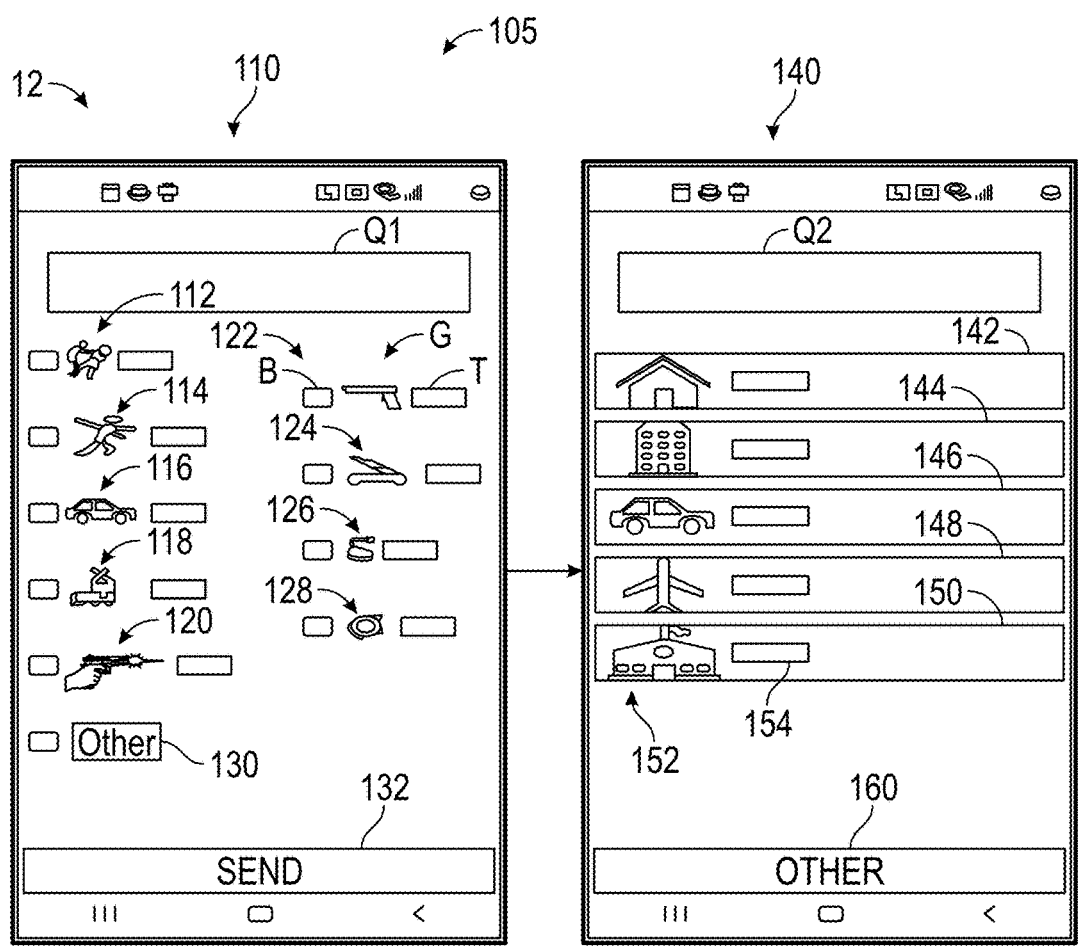
FIG. 2 is a schematic fragmentary diagram illustrating example screens of the mobile device of FIG. 1.

Referring to the drawings, wherein like reference numbers refer to like components, FIG. 1 schematically illustrates a communication system 10 for a mobile device 12 operable by a user 14. The mobile device 12 has a mobile application 16 stored on it, with a graphical user interface 18 and a touchscreen 19. FIG. 2 illustrates example screens 110 and 140 of the mobile device 12. It is to be understood that the mobile device 12 may take many different forms and have additional components.

Referring to FIG. 1, a controller C is configured to interface with the mobile application 16. The controller C may be embedded within the mobile device 12. The controller C is adapted to selectively execute a stealth mode 20 for message transmissions 22 between a user 14 of the mobile device 12 and a remote assistance unit 26. The stealth mode 20 allows for speedy communication in total silence, which provides an advantage in a situation where a user 14 is not free to speak using the mobile device 12. The remote assistance unit 26 includes at least one advisor 28 having access to an electronic device 30. The electronic device 30 may be a non-mobile or mobile platform, including but not limited to, a desktop computer, laptop, tablet, cell phone or wearable device. The electronic device 30 includes a control unit 31 having an integrated processor, an integrated memory and other circuitry available to those skilled in the art.

The communication system 10 allows the user 14 to request help covertly, via the stealth mode 20. The stealth mode 20 is activated based in part on a signal from the mobile application 16 and includes muting each audio stream in the mobile device 12. The stealth mode 20 includes alerting the advisor 28 when one or more predefined criteria are met. The communication system 10 may employ a prescribed message syntax for assembling presentations for the graphical user interface 18. For example, the controller C may incorporate a text message syntax (in the transmission 22) that is parsed by the mobile application 16 to present inbound messages as a dialog. As described below, the stealth mode 20 may employ front-loaded questions, pushbutton replies, and a queue of unread messages to circumvent delays associated with traditional texting, e.g., sentence formation, typing, error correction, and waiting for replies. This reduces texting issues, time spent fighting autocorrect and/or time spent waiting for the other party to compose and type out a reply. Stated differently, a zero-latency interrogation of the user 14 is achieved, so that the advisor 28 may learn basic facts quickly. A transmission from the user 14 to the advisor 28 may include more than the text message. For example, every transmission may be accompanied by metadata fields such as GPS location, customer ID and the battery power level.

The message transmissions 22 may employ a text messaging protocol 32, or communication standard such as SMS (Short Message Service), MMS (Multimedia Messaging Service), RCS (Rich Communication Service) and others over a cellular network. MMS is a media variant of an SMS message that allows users to send images, videos, or audio via a cellular network. RCS is a set of communication standards for SMS, MMS. As such, the message transmissions 22 may include ASCII strings containing delimited fields, where the human-to-human messages occupy one field and the rest is metadata.

In some embodiments, the message transmissions 22 may employ a wireless network 34, which may be a short-range network or a long-range network. The wireless network 34 may be a communication BUS, which may be in the form of a serial Controller Area Network (CAN-BUS). The wireless network 34 may be a serial communication bus in the form of a local area network. The local area network may include, but is not limited to, a Controller Area Network (CAN), a Controller Area Network with Flexible Data Rate (CAN-FD), Ethernet, blue tooth, WIFI and other forms of data. The wireless network 34 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of network technologies or communication protocols 36 available to those skilled in the art may be employed for rendering the message transmissions 22.

While one type of text messaging protocol 32 (such as SMS and/or RCS) may be used in the initial stages of the session, in some embodiments, the session may automatically upgrade or downgrade to a different type of text messaging protocol 32 (such as MMS), wireless network 34 or other communication protocol 36, depending on connectivity, battery power conditions and other factors. The message transmissions 22 sent back and forth may optionally be encrypted for privacy using methods available to those skilled in the art.

Referring to FIG. 1, the controller C has at least one processor P and at least one memory M (or non-transitory, tangible computer readable storage medium) on which instructions are recorded for executing a method 200 of operating the stealth mode 20, described in detail below with respect to FIG. 3. The memory M can store controller-executable instruction sets, and the processor P can execute the controller-executable instruction sets stored in the memory M.

Figure 3:
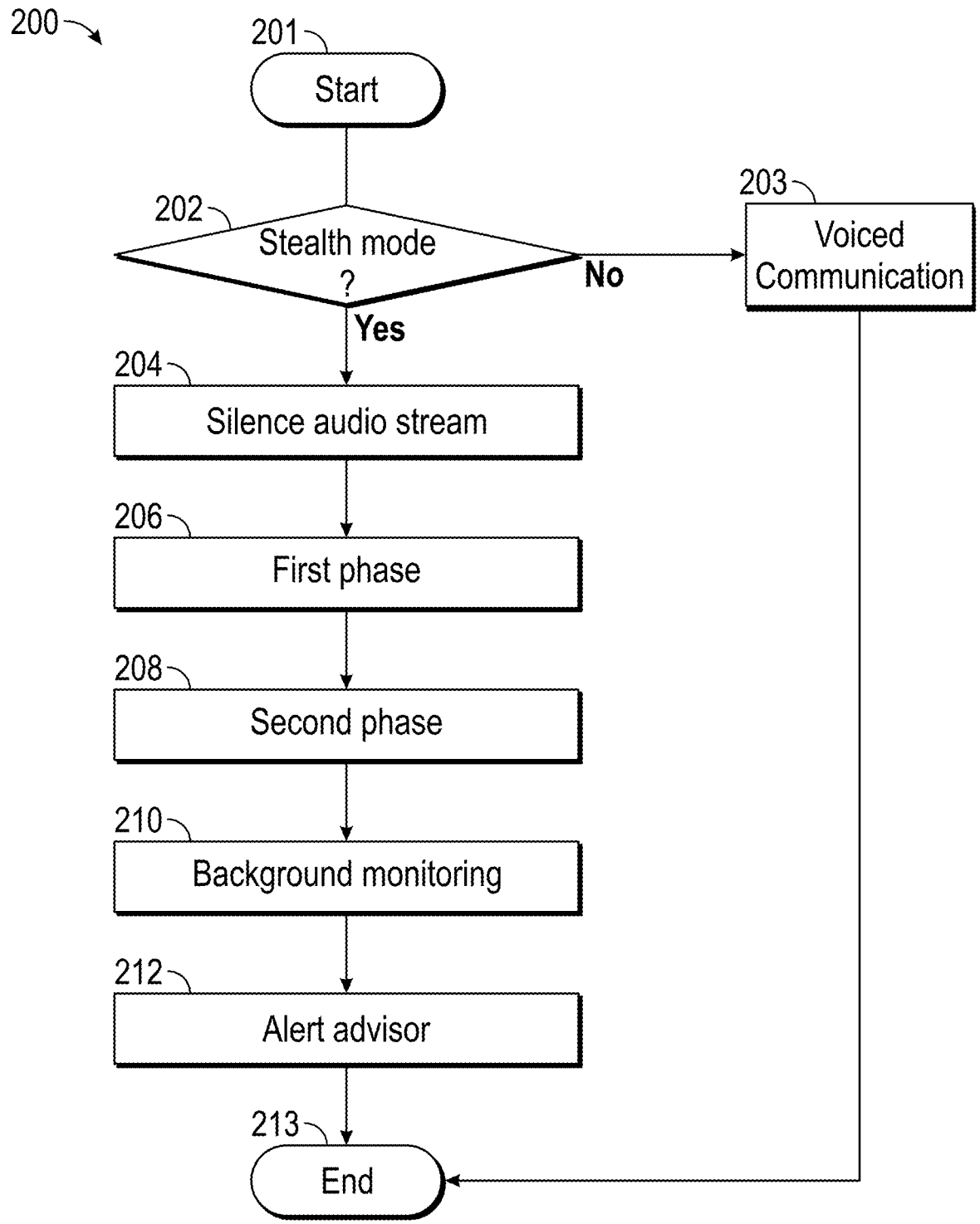
FIG. 3 is a flowchart for a method of operating the stealth mode of FIG. 1.

Referring now to FIG. 3, a flowchart of the method 200 of operating the stealth mode 20 is shown. Method 200 may be embodied as computer-readable code or stored instructions. Method 200 may be fully or partially executable by the controller C and/or mobile application 16 of FIG. 1. Method 200 may be executed in real-time, continuously, systematically, sporadically and/or at regular intervals. Method 200 of FIG. 3 begins at block 201 and ends at block 213. Method 200 need not be applied in the specific order recited herein. Furthermore, it is to be understood that some blocks may be eliminated.

Per block 202 of FIG. 3, when a user 14 opens the mobile application 16, it first asks whether the user 14 wishes to communicate via the stealth mode 20. If so, the method 200 advances to block 204, where each audio stream on the mobile device 12 is silenced or muted (e.g., music, alarms, games, ringtones, system notifications, etc.), and vibrate notifications disabled. Additionally, a non-disturbance mode is enabled which limits visual interruptions. The muting may be performed by the mobile application 16 and/or controller C. If the user 14 does not wish to activate the stealth mode 20, per block 203, they may be connected to the advisor 28 through other communication channels e.g., a regular voiced phone call.

Method 200 proceeds from block 204 to block 206, where the mobile application 16 and/or controller C is adapted to execute a first phase 105 (of inquiries) to the user 14, along with one or more pre-populated replies. The first phase 105 may be relayed via the graphical user interface 18, which may include relatively large pushbuttons for the user 14 to select from. The first phase 105 represents silent interrogatories or a question-based dialog that may be led by the machine logic embodied in the controller C.

FIG. 2 illustrates example screens 110 and 140 of the mobile device 12. In the embodiment shown in FIG. 2, the first phase 105 includes a first question box Q1 (in screen 110) and a second question box Q2 (in screen 140). The first question box Q1 presents a question about the nature/type of the situation along with one or more pre-populated replies. For example, the first question box Q1 may encapsulate the following message: "What emergencies are you facing? Check all that apply." Examples of pre-populated replies 112, 114, 116, 118, 120, 122, 124, 126, 128 are shown in screen 110.

Referring to FIG. 2, the pre-populated replies each include a respective symbol or graphical icon G, a respective checkbox B (for the user 14 to tick or check) and a respective textbox T with a verbal description (e.g., assault, kidnapping, carjacking, shooting etc.) of the particular pre-populated reply. Screen 110 of FIG. 2 includes an alternative box 130 stating "Other", which may be selected when none of the pre-populated replies cover the situation faced by the user 14. Additionally, screen 110 may include a "Send" box 132 for the user 14 to press once the appropriate pre-populated replies have been checked. The responses are immediately relayed to the remote assistance unit 26.

Referring to screen 140 in FIG. 2, the second question box Q2 presents a question about the location of the situation. For example, the second question box Q2 may encapsulate the following message: "Where is the emergency happening?". Examples of pre-populated replies 142, 144, 146, 148 and 150 are shown in screen 140. The pre-populated replies each include a respective symbol or graphical representation 152 and/or a textbox 154 with a verbal description (e.g., home, office, vehicle, plane, school, etc.) of the specific pre-populated reply. Screen 140 of FIG. 2 may include box 160 stating "Other", to be selected when none of the pre-populated replies fit the question asked. The reply is immediately relayed to the remote assistance unit 26.

Proceeding to block 208 of FIG. 3, the method 200 includes executing a second phase 305 (of inquiries) to the user 14, via the mobile application 16. Based on the facts gathered from the first phase 105, a few follow-on questions (forming the second phase 305) are automatically generated and presented, with negligible delay. In other words, the second phase 305 is dynamically assembled based on the respective responses by the user 14 to the first phase 105. For example, if the user 14 indicated that there are weapons involved, the second phase 305 would include a query on whether the user 14 has indeed seen the weapons. If a school was indicated as the location in the second question box Q2, the second phase 305 would ask if the school had been locked down. Responses to the questions may be relayed to the remote assistance unit 26 in real time. The first phase 105 and the second phase 305 are automated and intended to gather information quickly to help the advisor 28 discern what resources are needed, without waiting for the advisor 28 to compose messages.

Figure 4:
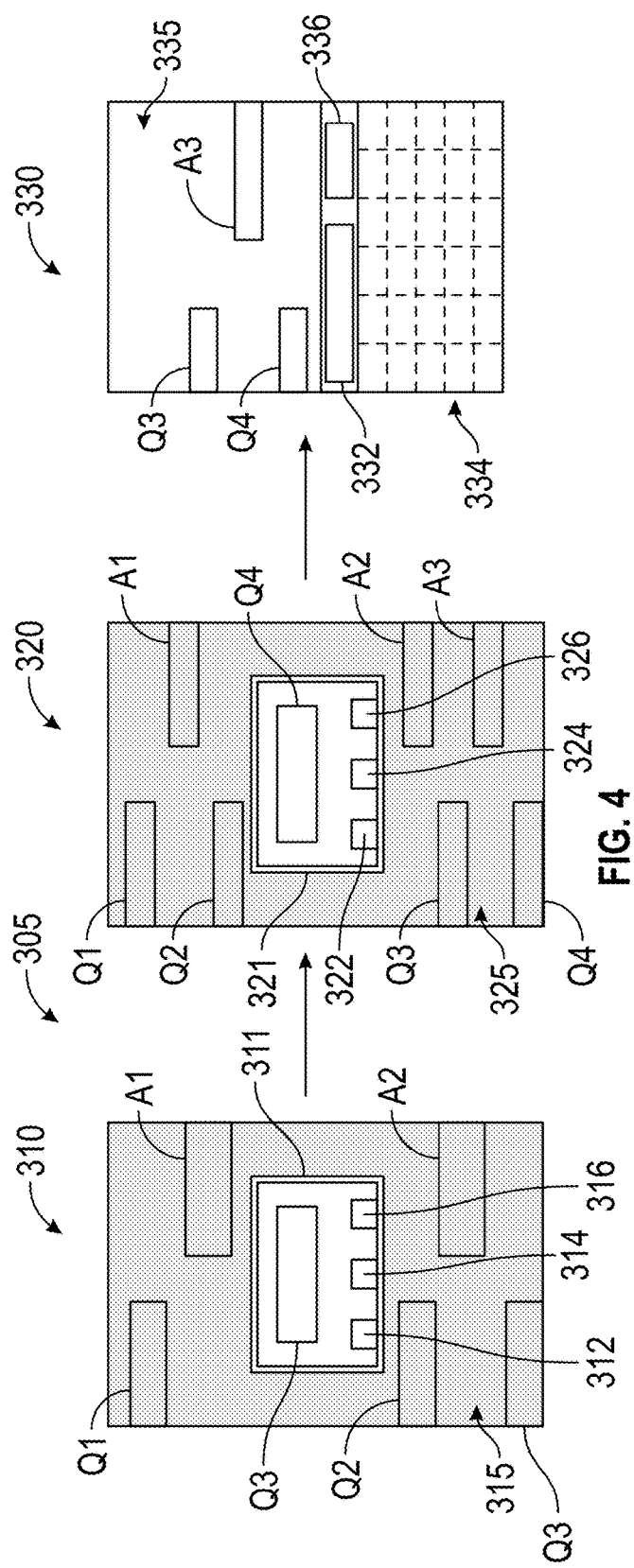
FIG. 4 is a schematic fragmentary diagram illustrating other example screens of the mobile device of FIG. 1.

The mobile application 16 of FIG. 1 may maintain two parallel streams of communication with the user 14. For example, referring to FIG. 4, the screen 310 of the mobile device 12 includes dual streams, with the first being a dialog box 311 in the foreground and the second being a chat transcript 315 in the background (lightly shaded areas in screen 310). Each message transmission 22 originating from the advisor 28 results in two updates to screen 310. One update is the display of dialog box 311, which may be a pop-up box, and may include questions and/or directives, with suggested replies. Referring to FIG. 4, the second update is the addition of the question (minus the suggested replies) to the chat transcript 315, which shows the history of messages exchanged between the user 14 and the remote assistance unit 26 (e.g., first question box Q1, the first answer A1, the second question box Q2 and the second answer A2). Similarly, the screen 320 (see FIG. 3) of the mobile device 12 shows a dialog box 321 in the foreground and a chat transcript 325 in the background.

When the advisor 28 and/or control logic sends a message to the user 14, the dialog box 311 (see FIG. 4) is invoked above or "in front of" the chat transcript 315. Referring to FIG. 4, screen 310 presents a third question Q3 in the dialog box 311 with pushbuttons displaying several options for proposed replies, the first option 312, second option 314 and third option 316, for the user 14 to select from. For instance, an advisor 28 may ask if the user 14 is injured by transmitting "Is anyone else injured?" as the third question Q3 in dialog box 311, with the first option 312, second option 314 and third option 316 corresponding respectively to "Yes", "No" and "Unsure". The user 14 may tap on a reply to select it as their response, thereby providing a faster alternative to typing. The respective questions (once posed) may be moved to the chat transcript 325 immediately. Once answered, the respective replies are moved to the chat transcript 325 (see screen 320). As shown in screen 320 of FIG. 4, the next question (e.g., fourth question Q4) is presented in the dialog box 321 with first option 322, second option 324 and third option 326 for the user 14 to select from. It is understood that the number of questions and number of options may be varied based on the application at hand.

One problem that may arise is that the user 14 may be in the middle of typing a reply when one or more additional questions arrive from the remote assistance unit 26. Additionally, there may be gaps or delays between replies sent and messages arriving from the advisor 28. To counter this, the mobile application 16 maintains a local queue for messages from the remote assistance unit 26 and ensures that only one dialog box with one message is displayed at any given moment. The queue is maintained in the memory M of the controller C and/or the mobile device 12. If a new message from the advisor 28 arrives while the user 14 is consuming a prior message, the new message is not displayed, but is placed in a queue. Once the user 14 replies to the pending question, the next question in the queue immediately appears. This process continues until the queue is empty. If nothing is in queue when a new advisor message arrives, the message is displayed immediately in dialog box 311. This feature allows the advisor 28 to dispatch instructions and queries as fast as they would like. They may queue up questions that will be presented to the user 14 one at a time, with zero delay between prompts. In some embodiments, the advisor may manipulate the queue stored on the mobile device 12. While newly arriving messages are generally appended to the end of the queue, the advisor 28 may send an urgent message to the front of the queue. Likewise, they may remove a question from the queue or even flush the queue entirely. The result is a relatively rapid-fire set of inquiries and instructions, speeding up communication.

At times when there are no messages pending, the screen 330 of FIG. 4 shows a text entry window 332 where the user 14 may type new messages, a keyboard 334, a "send" button 336 and the chat transcript 335. While the method 200 steers the user 14 away from the keyboard purposefully, the user always has access to the keyboard 334 (see FIG. 4). If the user 14 wants to manually type a message, they may dismiss the dialog box 311 (see screen 310) by tapping outside the dialog box 311, thereby exposing the chat transcript 335 (see screen 330) and providing a keyboard 334 for input. The stealth mode 20 may include different types of prompts, depending on the syntax of the message. Interrogatories, directives (e.g., "Close the door") and open-ended questions (e.g., "Where is the shooter?") may each be presented differently in the dialog box 311. The syntax may be extended to include other aspects of presentation, such as setting a background color, display icons, etc.

Advancing to block 210 of FIG. 3, the method 200 includes monitoring background data from one or more sensors 40 (see FIG. 1) on the mobile device 12. The sensors 40 may be embedded electronic devices including, but not limited to, a GPS sensor 42, a temperature sensor 44, an accelerometer 46, and a power level sensor 48. In some embodiments, the controller C and/or control unit 31 may be adapted to read data from Bluetooth connected wearables, such as a fitness tracker or smartwatch 50 (see FIG. 1). Referring to FIG. 1, the controller C and/or control unit 31 may be configured to communicate with a cloud unit 60, which provides profile data of the user 14 to the controller C. The profile data includes the location coordinates of the mobile device 12 as well as other information. The cloud unit 60 may include one or more servers hosted on the Internet to store, manage, and process data. The cloud unit 60 may be a private or public source of information maintained by an organization, such as for example, a research institute, a company, a university and/or a hospital.

First, with regard to background communication, operating the stealth mode 20 may include transmission of background messages to and from the remote assistance unit 26. In other words, background (non-chat) messages may be sent in either direction. The background messages are not shown in the chat transcript 335. Examples of communications sent from the advisor 28 to the controller C (or mobile application 16) are listed below. These may be for checking the hardware state (e.g., "Is the user connected to Wi-Fi?"), affecting the display (e.g., "Show the screen for selecting colors"), reading sensors (e.g., "What is the ambient temperature?") and to control the handset hardware. These requests may be communicated with specific predefined calling codes instead of text as listed above.

Second, with regard to event monitoring, per block 210 of FIG. 3, the controller C may be adapted to monitor for at least one predefined event ("at least one" omitted henceforth), such as the detection of a sudden loud noise or detection that the user 14 is changing their geographical location very quickly (i.e., running). Such events would trigger a background transmission which would identify the event and provide associated metadata (e.g., the volume of a loud noise). Non-limiting examples of such transmissions may include, (1) "Battery level: 29%"; (2) "User is running North"; (3) "It just got very dark"; (4) "Loud noise detected"; and (5) "User has backgrounded this app." In an example where a smartwatch 50 is connected, the transmission may include: "Heart rate: 100 BPM".

Block 210 may further include monitoring of the power level of the mobile device 12. If the battery power level falls below a predefined threshold, the controller C and/or mobile application 16 may take steps to reduce power consumption. Operating the stealth mode 20 may include remotely manipulating at least one of the multiple hardware settings, based in part on the background transmissions and/or the battery power level. The multiple hardware settings include, for example, volume control, battery power management and display brightness. In some embodiments, the stealth mode 20 requires that the user 14 grant it various privileges so that it may enable, disable, and read certain system functions such as reading and sending texts, controlling volume, managing power, disabling services, etc. Additionally, the advisor 28 may initiate a background message to control the handset hardware (e.g., "Dim the display and turn off Bluetooth").

Per block 212 of FIG. 3, the method 200 includes alerting the advisor 28 for assistance. The advisor 28 may be alerted immediately upon the stealth mode 20 being activated or after a specific number of minutes post-activation. The advisor 28 may choose to communicate via the text entry window 332 and keyboard 334 instead of the "dialog prompting" mode. In this case, the dialog boxes (as illustrated in screens 310 and 320) are no longer displayed, however the screen continues to display the chat transcript (as shown in screen 330).

Figure 5:
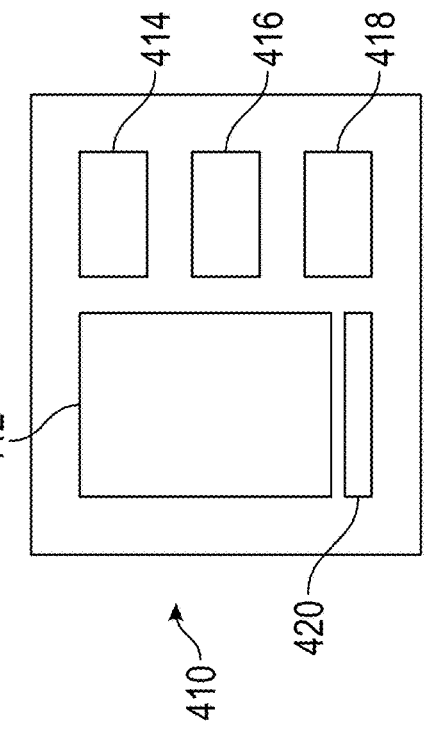
FIG. 5 is a schematic fragmentary diagram of an example display screen in employable in the remote assistance unit of FIG. 1.

As noted above, the advisor 28 is provided access to an electronic device 30. FIG. 5 shows a schematic example of a display screen 410 connected to the electronic device 30. The display screen 410 is employed to broadcast various types of information. For example, the display screen 410 may include a transcript box 412, a user information section 414, a background monitoring box 416 and a satellite imagery map 418 of the present location of the user 14. The display screen 410 includes a text window 420 for the advisor 28 to manually enter messages using a prescribed or predefined syntax, e.g., a string such as "Is the door locked?|Yes|No|Uncertain", which would render as the question "Is the door locked?" with the possible responses being "Yes", "No" and "Uncertain". To reduce keystrokes, certain keywords may be used for common phrases. For example, many questions have "Yes", "No" and "Uncertain" responses, which could be denoted by a keyword "YNU", thus shortening the above syntax to "Is the door locked?|YNU".

To speed communication, the advisor 28 may use an input device such as a mouse (not shown) to select from a list of common queries composed of prefabricated transmissions. The list of pre-programmed questions may be provided by the software that generates and interacts with screen 410. Alternatively, the advisor 28 may dictate messages via a real-time speech-to-text unit 52 (see FIG. 1), using specific keywords to construct the message syntax. The real-time speech-to-text unit 52 may be built into the software that generates and interacts with screen 410, or it may be provided via a cloud service (e.g., cloud unit 60 in FIG. 1). The spoken words may be translated to text in real time and placed in the text window 420. The spoken words may also be post-processed to expand certain keywords as the text window 420 is populated, e.g., the spoken words "Is anyone else injured triple choice" might be post-processed to yield the text message syntax "Is anyone else injured triple choice?|Yes|No|Uncertain".

In summary, the communication system 10 (via execution of the method 200) provides a host of measures to minimize keyboard use, via a stealth mode 20. The stealth mode 20 incorporates a non-verbal mode of communication. Message transmissions 22 sent from the advisor 28 may be syntactically structured to include several proposed answers. The mobile application 16 and/or controller C may parse the messages and render the messages with a graphical user interface 18. The ergonomics of the graphical user interface 18 may direct the user 14 towards preprogrammed replies, while continuing to provide access to a keyboard 334, and text entry window 332. The advisor 28 may queue up questions in a local queue in the mobile application 16 while the user 14 is processing previous messages. Once the user 14 replies to a message, the next pending message (if present) may be immediately displayed, without dead air therebetween.

The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a group of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating rechargeable energy storage system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products of various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based rechargeable energy storage systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A communication system for a mobile device, comprising:
   a mobile application stored on the mobile device, the mobile application having a graphical user interface and a touchscreen;
   a controller configured to interface with the mobile application, the controller including a processor and tangible, non-transitory memory on which instructions are recorded;
   wherein the controller is adapted to selectively execute a stealth mode for message transmissions between a user of the mobile device and a remote assistance unit, including:
   activating the stealth mode based in part on a signal from the mobile application;
   muting each audio stream in the mobile device and disabling vibrate notifications;
   submitting a first phase of inquiries to the user, via the graphical user interface, along with one or more prepopulated replies;
   executing a second phase after the first phase, the second phase being automatically generated based on respective responses from the user to the first phase;
   monitoring a power level of the mobile device in real time and enabling a non-disturbance mode that limits visual interruptions to the message transmissions in the stealth mode; and
   alerting an advisor in the remote assistance unit.

2. The communication system of claim 1, wherein:
   the mobile device includes at least one sensor; and
   wherein operating the stealth mode includes monitoring the at least one sensor for a predefined event and transmitting a background message to the remote assistance unit to signal detection of the predefined event.

3. The communication system of claim 2, wherein the predefined event includes the user changing a geographical location.

4. The communication system of claim 2, wherein:
the mobile device includes multiple hardware settings; and
operating the stealth mode includes remotely manipulating at least one of the multiple hardware settings, based in part on the predefined event and/or a power level of the mobile device.

5. The communication system of claim 4, wherein the multiple hardware settings include at least one of volume control, battery power management and display brightness.

6. The communication system of claim 1, wherein the mobile application is adapted to maintain respective messages from the remote assistance unit in a local queue, such that the respective messages are presented successively without dead air therebetween.

7. The communication system of claim 1, wherein the message transmissions incorporate a text messaging protocol, including transmitting delimited text strings having respective messages and respective metadata.

8. The communication system of claim 1, wherein the message transmissions include respective dual streams presenting a dialog box in a foreground and a chat transcript box in a background of the mobile device.

9. The communication system of claim 8, wherein:
operating the stealth mode includes transmitting background messages to the remote assistance unit, the background transmissions being triggered by a timer; and
the background messages are not shown in the chat transcript box.

10. The communication system of claim 1, wherein the first phase of the inquiries includes a nature of an emergency and a location of the emergency.

11. The communication system of claim 1, further comprising:
a cloud unit configured to interface with and provide a user profile data to the mobile application and the controller, the user profile data including respective location coordinates of the mobile device.

12. The communication system of claim 1, wherein the message transmissions to the user include silent interrogatories driven by the controller and/or the advisor.

13. The communication system of claim 1, wherein the message transmissions to the user include directives driven by the controller and/or the advisor.

14. The communication system of claim 1, wherein the message transmissions to the user include open-ended questions driven by the controller and/or the advisor.

15. A method of operating a communication system for a mobile device, the method comprising:
storing a mobile application stored on the mobile device, the mobile application having a graphical user interface and a touchscreen;
interfacing the mobile application with a controller having a processor and tangible, non-transitory memory on which instructions are recorded;
selectively executing a stealth mode for message transmissions between a user of the mobile device and a remote assistance unit, via the controller, including:
activating the stealth mode based in part in a signal from the mobile application and disabling vibrate notifications;
muting each audio stream in the mobile device;
submitting a first phase of inquiries to the user, via the graphical user interface, along with one or more pre-populated replies;
executing a second phase of inquiries to the user after the first phase, the second phase being automatically generated based on respective responses from the user to the first phase;
monitoring a power level of the mobile device in real time and enabling a non-disturbance mode that limits visual interruptions to the message transmissions in the stealth mode; and
alerting an advisor in the remote assistance unit.

16. The method of claim 15, wherein the mobile device includes at least one sensor and operating the stealth mode includes:
monitoring the at least one sensor for a predefined event; and
transmitting a background message to the remote assistance unit to signal detection of the predefined event.

17. A communication system for a mobile device, comprising:
a mobile application stored on the mobile device, the mobile application having a graphical user interface and a touchscreen;
a controller configured to interface with the mobile application, the controller including a processor and tangible, non-transitory memory on which instructions are recorded;
wherein the controller is adapted to selectively execute a stealth mode for message transmissions between a user of the mobile device and a remote assistance unit, including:
activating the stealth mode based in part on a signal from the mobile application;
muting each audio stream in the mobile device and disabling vibrate notifications;
monitoring a power level of the mobile device in real time and enabling a non-disturbance mode that limits visual interruptions to the message transmissions in the stealth mode;
submitting a first phase of inquiries to the user, via the graphical user interface, along with one or more pre-populated replies;
executing a second phase after the first phase, via the mobile application, the second phase being automatically generated based on respective responses from the user to the first phase; and
alerting an advisor in the remote assistance unit.

* * * * *